Oct. 28, 1941.  F. H. HOPKINS  2,261,027
GUARD DEVICE FOR PRESSURE-RESPONSIVE INSTRUMENTS
Filed Dec. 14, 1939  2 Sheets-Sheet 2

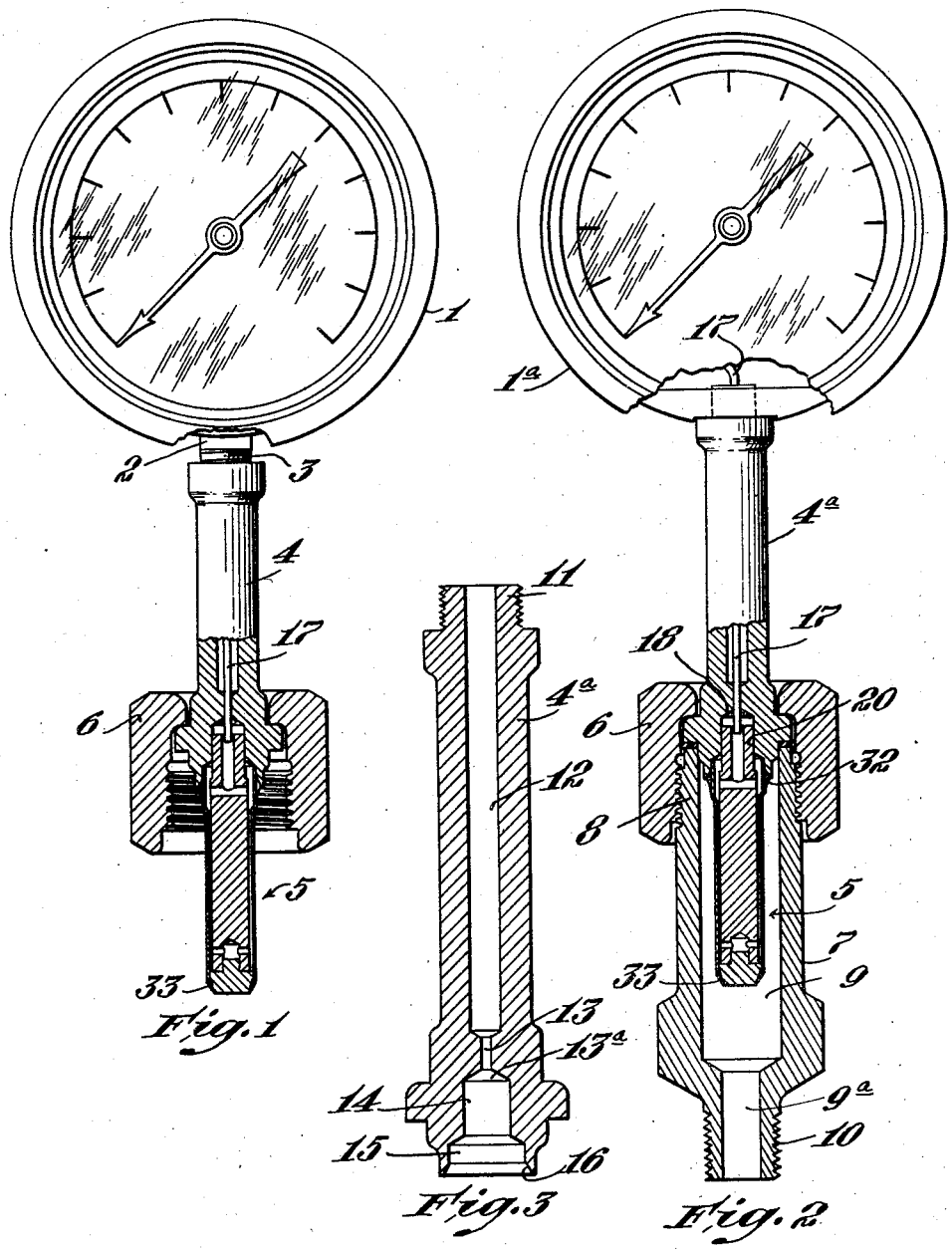

Inventor
Frank H. Hopkins
by Roberts Cushman & Woodberry
att'ys.

Patented Oct. 28, 1941

2,261,027

UNITED STATES PATENT OFFICE 2,261,027

GUARD DEVICE FOR PRESSURE-RESPONSIVE INSTRUMENTS

Frank H. Hopkins, Fairfield, Conn., assignor to Manning, Maxwell & Moore, Incorporated, New York, N. Y., a corporation of New Jersey Application December 14, 1939, Serial No. 309,155

19 Claims. (Cl. 73—31)

This invention pertains to pressure gauges or instruments of the same general class, characterized in having a pressure-sensitive element (for instance a Bourdon tube) which moves in response to variations in fluid pressure to which it is subjected, the invention relating more particularly to a guard or protective device operative to prevent injury to such pressure-sensitive element by reason of the nature of the pressure fluid or substances included in the latter.

In my copending application for Letters Patent, Serial No. 134,312, filed April 1, 1937, on which Patent No. 2,207,807, issued July 16, 1940, it is pointed out that when the pressure fluid, for example a chemical substance, is of a corrosive nature or when it contains solids in suspension, for instance when the fluid is muddy water, it is not permissible to allow the pressure fluid to enter the instrument since the accuracy and usefulness of the latter would soon be destroyed by the action of the fluid or the suspended solids upon its sensitive and sometimes delicate parts.

In the aforesaid application various forms of guard device are disclosed, in each case comprising a chamber having a resiliently yieldable wall exposed externally to the pressure fluid, said chamber and the pressure-sensitive element of the gauge, together with connecting passages, being filled with a non-compressible liquid. While certain at least of the guard devices disclosed in said application are very useful for their intended purpose, the devices therein illustrated are not all suitable for use with combination gauges (that is to say gauges which indicate vacuum as well as superatmospheric pressures); they are not all acceptable for use in the processing of foodstuffs, for instance milk pasterization, in which the sanitary requirements are extremely rigid; and they are not all as durable, particularly with respect to mechanical damage as is requisite for certain uses, for example, when the gauge and its accessories must frequently be removed from and reassembled with the pressure apparatus.

The present invention has for its principal object the provision of a guard device of the character described which will function substantially as well in respect to vacuum as to subatmospheric pressures and which meets all sanitary requirements of the food processing industry; and to provide a guard device of durable construction which is not easily damaged by handling.

A further object of the invention is to provide a guard device of the character described and embodying the above desirable features and which is of simple construction, easy to manufacture, and which may be made to sell at a commercially acceptable price.

Other and further objects and advantages of the invention will be pointed out in the following more detailed description, and by reference to the accompanying drawings wherein Fig. 1 is a front elevation of a gauge of a standard type provided with a guard device and associated parts embodying the present invention;

Fig. 2 is a fragmentary vertical section showing a gauge of slightly different construction, and having the improved guard associated therewith, the guard and accessories also being in vertical section;

Fig. 3 is a vertical section illustrating a connecting stem useful in assembling the improved guard device with the gauge in a manner which is desirable when the device is to be used for food processing, for instance milk pasteurization;

Figure 4:
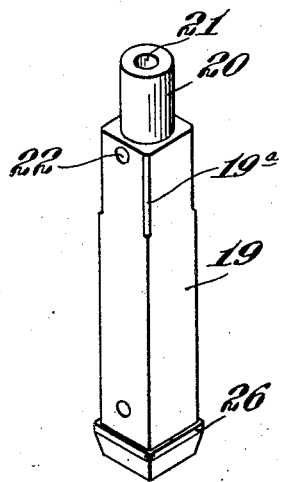
Fig. 4 is a perspective view of a core member forming a desirable part of the guard device.
Figure 5:
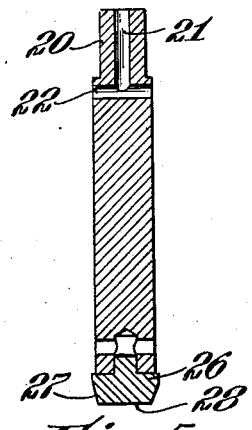
Fig. 5 is a vertical section of the core of Fig. 4.

Following the terminology employed in the aforesaid application, the flexible-walled chamber or bulb which forms the essential part of the guard device may hereinafter be referred to for convenience as a "pressure flask."

Referring to the drawings the numeral 1 designates a pressure gauge, for example a gauge of the Bourdon tube type, as an instance of an instrument of the general class to which the present invention appertains. The gauge 1 as illustrated in Fig. 1 is of the kind which has a fitting 2, including the externally screw-threaded nipple portion 3, designed to form a support for the gauge and for connection to a pressure supply pipe or other part at which pressure fluid is admitted. To facilitate the use of this gauge in such operations as food processing, for example, milk pasteurization, where it is requisite that the gauge and its appurtenances be readily attached to and removed from the processing apparatus, a tailpiece or stem 4 may be employed, such tailpiece or stem being tubular and of such length as may be most convenient, and having an internally screw-threaded socket at its upper end for the reception of the nipple 3 of the gauge. The lower part of this tailpiece 4 carries the protector or guard device 5 and is preferably furnished with a union nut 6 for securing it to the part of the apparatus with which it is to be associated.

In Fig. 2 the gauge 1ª (which may also be a Bourdon tube pressure gauge or the like) is of a type which does not have the projecting nipple 3 but which, instead, has an internally screw-threaded socket for receiving the upper end of the tailpiece or stem 4ª. This stem 4ª is in general similar to the stem 4 previously referred to, having the protector or guard device 5 attached to its lower end and having the union nut 6, by means of which it may be removably secured to a suitable part, for example, the tubular housing 7 which is externally screw-threaded at its upper part 8 for cooperation with the union nut and which has the chamber 9 for the reception of the protective device 5 and to which pressure fluid is admitted through the passage 9ª leading upwardly from the lower end of an externally screw-threaded nipple portion 10, the latter being intended to be screwed into a suitable socket in the wall of the treating vat or other apparatus with which the gauge is associated. In this instance the upper end of the tailpiece 4ª is furnished with the externally screw-threaded nipple portion 11 (Fig. 3) which is designed to screw into the socket in the case of the gauge 1ª. The tailpiece is tubular, having the longitudinal axial passage 12 which is preferably contracted in diameter at the lower portion of the tailpiece to provide the small axial bore 13. The bore 13 flares at its lower end, as shown at 13ª, and merges with a cylindrical, axial recess 14 which in turn merges at its lower end with an axial socket 15 of larger diameter whose walls flare outwardly at the lower end of the tailpiece, as shown at 16. A pipe or tube 17 extends through the passage 12 in the tailpiece, the upper end of this pipe or tube 17 leading up into the case of the gauge and being connected to the fixed end of the Bourdon tube or other pressure-sensitive element constituting the motor means for operating the gauge movement. The lower portion of the pipe 17 fits snugly within the bore 13 of the tailpiece and is permanently secured to the tailpiece, for example by welding metal, solder or the like, indicated at 18 (Fig. 2), and which fills the flaring enlargement 13ª of the bore 13 where the lower end of the pipe 17 emerges into the recess 14.

The protective or guard device 5 in accordance with the present invention is illustrated in detail in Figs. 4 to 10 inclusive. This guard device, in a preferred form, comprises a rigid core 19 of any desire durable material, the major portion of which is substantially square in transverse section, but which in a preferred form has a cylindrical stem portion 20 at its upper end of an external diameter such that it may fit snugly but with a sliding fit in the cylindrical guide recess 14 of the tailpiece. While such a cylindrical stem is desirable, since it is very easy to provide a cylindrical socket in which it will snugly fit, yet it is obvious that a stem portion of polygonal section may be used if desired, and that the socket may be of any section suitable to receive the stem and to facilitate the provision of a leak-tight joint. This stem 20 is provided with an axial bore 21 which opens into a transverse canal 22 extending from one side to the other of the upper end of the square portion of the core. A second transverse canal 23 extends from one side to the other of the core near its lower end and is intersected by an axial bore 24 which is designed to receive a cylindrical stem member or stub 24ª integral with a closure member or plug 25 (Fig. 6) which forms the lower end of the core member and which also constitutes the closure for the pressure flask about to be described. The body portion 26 of this plug 25 is square and has substantially vertical sides but is somewhat larger in cross-sectional area than the body portion 19 of the core so that when the body portion and plug are united a distinct shoulder (Fig. 4) is formed where the plug projects outwardly beyond the sides of the body portion of the core. Preferably the lower part of the plug is downwardly tapered, as indicated at 27. The plug 25 is assembled with the body portion of the core and permanently united thereto in any suitable manner, as, for example, by sweating them together, or if preferred by the use of a pin (not shown) passing through the lower part of the body portion and through an opening in the stub or stem 24.

The pressure flask forming a part of the guard or protective device comprises a hollow shell 29 (Fig. 7) conveniently made from seamless drawn metal tubing, for example stainless steel, the tubing having thin, stiffly resilient, externally smooth walls, for example walls of the order of 0.013 inch thick. Obviously other materials than steel may be employed provided they possess the desired characteristics of resiliency, flexibility, strength and capability of withstanding the action of the pressure fluid to which the guard device is to be subjected. While by reason of the resiliency of its walls the internal capacity of the flask may vary substantially in accordance with variations in external pressure to which it is subjected, the shell is of substantially constant length except for the very slight expansion or contraction due to temperature change.

Figure 9:
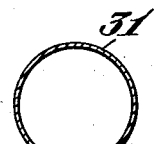
Fig. 9 is a section on the line 9—9 of Fig. 7.
Figure 8:
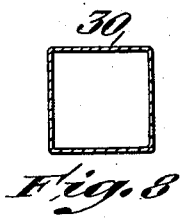
Fig. 8 is a section on the line 8—8 of Fig. 7.

As herein illustrated, by way of example, this shell 29 is of square transverse cross section, as indicated at 30 (Fig. 8) throughout the major portion of its length, but at its upper end is of circular transverse section, as indicated at 31 (Fig. 9). This circular portion is of an external diameter such that it may be fitted snugly within the socket 15 of the tailpiece 4ª. After being thus fitted into the socket, the shell is permanently united to the tailpiece, for example by welding metal 32 (Fig. 2) or the like, which fills the annular wedge-shaped space provided by the flare 16 at the lower end of the tailpiece. The inner diameter of the circular portion 31 of the shell is such that when the core 19 is introduced into the shell the corners of the core member will bear against the inner surface of the circular portion 31. If desired, and in order to avoid contact of the normally sharp corners of the core with the seal, the corners of the core may be beveled off slightly, as indicated at 19ª (Fig. 4) where they are to bear against the inner surface of the part 31 of the shell. The transverse dimensions of the body portion 19 of the core member are such that when the core is disposed axially within the shell 29, there is a narrow space S (Fig. 10) between the surface of the body portion of the core and the inner surface of the shell, the transverse canals 22 and 23 in the core member opening into this space.

Figure 10:
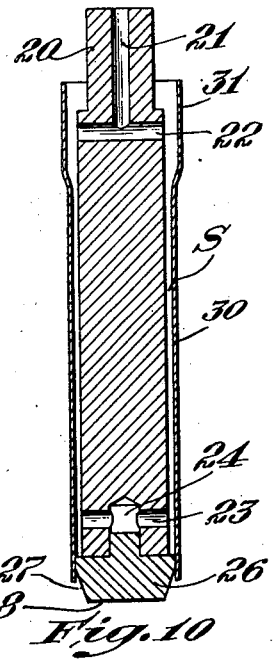
Fig. 10 is a vertical section of the guard device with the core projecting slightly from the lower end of the shell.
Figure 6:
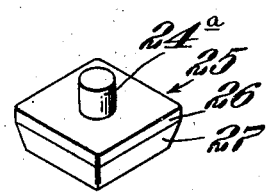
Fig. 6 is a front elevation of an end plug forming a desirable part of the guard device.
Figure 7:
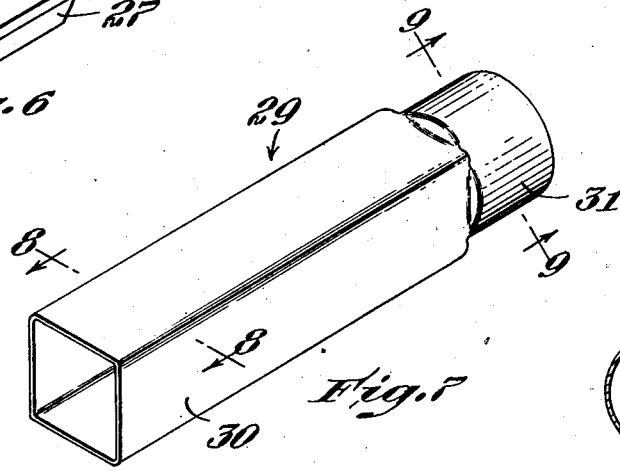
Fig. 7 is a perspective view of the outer pressure-sensitive shell or pressure flask of the guard device.

After the shell has been assembled with the tailpiece, as above described, and permanently united thereto, the core is introduced into the shell, the stem portion 20 of the core being disposed in the guide recess 14 of the tailpiece so that the lower end of the pipe 17 projects into the axial passage 21 of the core member. The core member is pushed up into the shell until it occupies a position such as shown in Fig. 10 and then the plug 25 is permanently secured to the lower end of the shell, for example, by the use of solder or welding metal at the point 33 (Fig. 2), such solder or welding metal filling the crevice between the lower edge of the shell and the beveled faces 27 of the plug. The lower end of the shell is thus permanently sealed by the plug, and as the upper end of the seal is permanently sealed to the lower end of the tailpiece the chamber S within the shell has but the single outlet 21 with which the interior of the pipe 17 communicates.

After the parts have thus been assembled the interior of the Bourdon tube, the pipe 17 and the space S, is completely filled with a non-compressible mobile liquid, for example glycerin or oil, and the filling opening is then sealed. Thereupon any pressure to which the exterior of the pressure flask (comprising the shell 29 with its closure plug 25) is subjected, is transmitted by this incompressible body of liquid to the pressure-sensitive element of the gauge and thus actuates the latter so as to indicate the pressure of the fluid which contacts the exterior surface of the pressure flask.

In the arrangement thus described it will be noted that the elongate stem portion 20 of the core is arranged to fit snugly within the elongate guide passage 14 of the tailpiece. Since the stem 20 and the tailpiece are both of rigid material and since the stem has a close sliding fit in the axially elongate recess 14, the core is held in rigid axial alignment with the tailpiece and thus the lower end of the core with its plug 25 is firmly held against any transverse movement. The plug 25 completely fills the lower end of the shell 29, and the core constitutes a rigid brace which effectively prevents transverse deflection of the free or lower end of the pressure flask. Thus even though the device be subjected to frequent handlings and even to rough usage, the thin and flexible walled shell is not easily damaged by reason of the firm support which its lower end receives from the rigid brace constituted by the core member. On the other hand the stem 20 is slidable in the elongate guide recess 14 and thus the slight variation in length of the core or of the shell 29 resultant from expansion or contraction of the metal due to temperature variations is permitted (without cramping or deflecting the parts) by the longitudinal sliding of the stem 20 in its guide recess.

Figure 11:
Fig. 11 is a view similar to Fig. 8, illustrating a shell of modified cross-sectional contour.

While as hereinabove described the body portion of the core 19 is made separate from the closure member or plug 25, it is contemplated that the core and the closure plug may be made integral if desired. It is further contemplated that while the pressure flask with its shell 29 is here specifically described as of square transverse section, it may be made of other polygonal cross section, preferably a regular polygon, for instance hexagonal, as shown at 30× (Fig. 11) if desired, it being preferred to employ a section such as to provide substantially parallel faces diametrically opposite to each other so as thereby to insure symmetrical deflection of the walls of the shell in response to external pressure.

The pressure flask of substantially square section presents substantially the same advantages, in so far as mode of operation is concerned, as the pressure flask of narrowly elongate transverse section described in my copending application Serial No. 309,008, filed December 13, 1939, but on the other hand has the further advantage of great strength to resist transverse deflection by reason of its included rigid strut 19. Since the core very nearly fills the shell 29, the space S is of small dimensions and thus the body of liquid within the pressure flask is quite small.

It may be noted that the exterior surfaces of the protective device 5, as herein disclosed, are smooth and thus very easily cleaned so that the device is acceptable for use in the processing of foods and the like where sanitary requirements are extremely rigid.

While certain desirable arrangements of parts have herein been disclosed by way of example, it is to be understood that the invention is not necessarily limited to the precise embodiments described, but is to be regarded as broadly inclusive of all equivalent constructions falling within the terms of the appended claims.

I claim:

1. Apparatus of the class described wherein a movable pressure-responsive actuating element constitutes a portion of the wall of a closed fluid-containing space and wherein a hollow body whose interior forms part of said space has resiliently yieldable walls externally exposed to the medium whose pressure is to be indicated and wherein a pressure-transmitting liquid fills said closed space and wherein an elongate rigid member is disposed within said hollow body, the rigid member being of such transverse dimensions as to provide a narrow fluid-receiving interspace between the walls of the hollow body and said rigid member, characterized in that said hollow body is rigidly supported at one end only and is substantially square in transverse section throughout the major part at least of its length, and further characterized in that said rigid member constitutes a brace to prevent deflection of the free end of said hollow body, said brace having a stem portion at one end, and an elongate tubular rigid part constituting the support for the brace member, said rigid part having in one end thereof a socket in which said stem portion fits snugly, the opposite end of the brace being designed and arranged to form a closure for the free end of the hollow body.

2. A guard for a pressure-responsive instrument, said guard comprising an elongate, substantially inextensible, thin-walled shell of resilient material, a tubular tailpiece of rigid material having a socket within which one end of the shell fits tightly and is permanently secured, said tailpiece having an elongate guide recess coaxial with said socket, the socket being of circular transverse section and the end of the shell which fits therein also being of circular section, the shell being of substantially square transverse section throughout the major part of its length, and a substantially rigid core member extending axially of the shell, one end of the core member fitting in said guide recess in the tailpiece and its opposite end being permanently united to and constituting a leak-tight plug for the free end of the shell, said core member being of lesser cross-sectional area than the shell so as to provide an interspace between them, there being a passage connecting said interspace with the bore of the tubular tailpiece.

3. A guard for a pressure-responsive instrument, said guard comprising an elongate, thin-walled shell of resilient material, a tubular tailpiece of rigid material having a socket within which one end of the shell fits tightly and is permanently secured, said tailpiece having an elongate guide recess coaxial with said socket, a rigid core member having one end fitted to slide in the guide recess of the tailpiece, the core member extending longitudinally of the shell to and terminating at the free end of the latter, and means forming a permanent leakproof union between the free end of the shell and the free end of the core member, the transverse dimensions of the core member being such as to provide a fluid-receiving space between the core member and the inner surface of the shell throughout the major portion of the length of the latter, there being a passage leading from said fluid-receiving space to the bore of the tubular tailpiece.

4. An instrument guard of the class described comprising an elongate thin-walled shell of resilient material, a tailpiece of rigid material having a socket within which one end of the shell fits tightly and is permanently secured, said tailpiece having an elongate guide recess coaxial with said socket, a rigid core member having a stem portion at one end which fits snugly within said guide recess, said stem portion having an axial passage, a conduit extending from said passage longitudinally of the tail piece to the instrument, the opposite end of the core member forming a closure for and being rigidly united to the other end of the shell, the core member being of such transverse dimensions throughout the major part of its length as to provide a fluid-receiving space between it and the inner surface of the shell, the core member having a transverse canal leading from said space to the axial passage in its stem portion.

5. A guard for a pressure-responsive instrument having a case, said guard comprising an elongate thin-walled shell of resilient material, an elongate connecting member uniting one end of the shell with the case of the instrument, said connecting member having a fluid duct extending longitudinally therethrough, the shell being of circular cross section at one end but being of substantially square cross section throughout the major portion of its length, a substantially rigid core member within the shell, one end of the core member being shaped to form a plug which completely fills the square end of the shell, the major part of the core member being of square cross section but of such dimensions as to leave a space between it and the inner surface of the shell, the opposite end of the core member having a guide stem portion which projects beyond the end of the shell, the connecting member having a socket in one end in which said guide stem portion slidably fits, said guide stem portion having an axial passage which connects with the fluid duct in said connecting member, and the core member having a transverse canal leading from the space between the shell and the core member into said axial passage.

6. A guard for a pressure-responsive instrument, said guard comprising an elongate thin-walled shell of resilient metal, said shell being of substantially square transverse section throughout the major portion of its length but being of circular section at one end, and a rigid core member housed within the shell, one end of the core member completely filling the square end of the shell, the core being of square transverse section throughout the major portion of its length and of such transverse dimensions intermediate its end portions as to provide an interspace between it and the inner wall of the shell, the core being of such diagonal dimension that its corners bear against the inner surface of the circular end portion of the shell thereby providing passages leading from said interspace to said end of the shell.

7. A guard device for a pressure-responsive instrument, said guard device comprising an elongate, thin-walled shell of resilient material, a rigid member having a bore therethrough and a socket concentric with said bore in which one end of the shell fits tightly and to which it is permanently secured, a rigid core member housed within the shell, the shell and core both being of substantially square transverse section throughout the major portion of their lengths, the core member terminating at and completely filling the free end of the shell but being of lesser transverse section throughout the major portion of its length thereby to provide an interspace between it and the square portion of the shell, that portion of the shell which fits within the socket being of circular transverse section and the part of the core which is disposed within said circular part of the shell being of such dimensions that its corners bear against the inner surface of the shell so that the latter is rigidly confined between the core and the inner wall of the socket, and means providing a passage leading from said interspace to the bore in said support.

8. A guard for a pressure-responsive instrument, said guard comprising an elongate pressure flask of seamless tubing of symmetrical transverse section open at one end and closed at its opposite end, means connecting the flask to the instrument, said connecting means including a rigid part permanently secured to the open end of the flask, and a brace constructed and arranged to prevent transverse deflection of the closed end of the flask, said brace being within the flask and of lesser cross-sectional area than the flask, one end of the brace engaging the closed end of the flask, the other end of the brace being so attached to said rigid part as to prevent angular movement of the brace with respect to said part.

9. A guard for a pressure-responsive instrument, said guard comprising an elongate thin-walled shell of substantially constant length and of stiffly resilient seamless metal tubing, connecting means operative to unite one end of the shell with the instrument, and brace means located within the shell, said brace means being anchored to the connecting means adjacent to said end of the shell and being of lesser cross-sectional area than the shell and extending longitudinally of the shell and bearing against the shell adjacent to the other end thereof so as to prevent transverse movement of said latter end of the shell.

10. A guard for a pressure-responsive instrument, said guard comprising an elongate thin-walled hollow shell of substantially constant length and of resilient material, said shell being of regular polygonal cross section, connecting means uniting the shell to the instrument, said connecting means including a rigid part to which one end of the shell is fixedly secured, an elongate rigid brace within the shell, said brace being of lesser cross-sectional area than the shell and being coaxial therewith, and anchorage means so uniting one end of the brace to said rigid part as always to maintain the brace in axial alignment with the shell, the other end of the brace being fixedly united to the free end of the shell thereby to prevent transverse movement of said latter end of the shell.

11. A guard for a pressure-responsive instrument, said guard comprising an elongate thin-walled peripherally seamless shell of substantially constant length and of resilient material, connecting means uniting the shell and instrument, said connecting means comprising a rigid part to which one end of the shell is rigidly secured, a rigid brace extending axially of and within the shell and having one end fixedly united to the free end of the shell, the brace being of lesser cross-sectional area than the shell, and means so connecting the other end of the brace to said rigid part as to prevent transverse movement of any portion of the brace.

12. A guard for a pressure-responsive instrument, said guard comprising an elongate tubular, smooth-walled shell of thin resilient material and of symmetrical transverse section, connecting means operative to connect one end of the shell with the instrument, and substantially rigid brace means arranged within the shell, said brace means comprising a part having a snug sliding fit in a socket in said connecting means, said brace means engaging the free end of the shell thereby to prevent transverse movement of the latter while allowing such axial movement of said end as results from expansion or contraction of the material in response to temperature variations.

13. A guard for a pressure-responsive instrument, said guard comprising an elongate, smooth-walled shell of thin resilient material and of substantially fixed length except for the minor variations resultant from temperature change, connecting means operative to connect one end of the shell with the instrument, and a rigid brace extending axially of and within the shell, said brace having one end fixedly united to the free end of the shell, the brace being of lesser cross-sectional area than the shell, the connecting means including a part having therein a rigid guideway in which the opposite end of the brace is snugly fitted, the brace being free to move axially of the guideway but being prevented by the walls of the guideway from moving transversely.

14. A guard for a pressure-responsive instrument, said guard comprising an elongate, substantially inextensible, thin-walled shell of resilient material, a tubular tailpiece of rigid material having a socket within which one end of the shell fits tightly, said tailpiece having an elongate guide recess coaxial with said socket, a rigid brace extending longitudinally and axially of the shell and terminating at and having one end fixedly secured to the free end of the shell, the brace being of lesser cross-sectional area than the shell so as to provide an interspace between them, there being a passage connecting said interspace with the bore of the tubular tailpiece, the opposite end of the brace fitting within said elongate guide recess in the tailpiece, the brace being operative to prevent transverse movement of the opposite end of the shell but permitting slight longitudinal movement of the free end of the shell which results from contraction and expansion of the material.

15. A guard for a pressure-responsive instrument, said guard comprising an elongate, smooth-walled shell of thin resilient material, a tubular tailpiece of rigid material having a socket within which one end of the shell fits tightly and is permanently secured, said tailpiece having an elongate guide recess coaxial with said socket, a rigid brace extending longitudinally of the shell and terminating at and being united to the other end of the latter and forming a permanent leakproof closure therefor, the opposite end portion of the brace fitting snugly in the guide recess in the tailpiece whereby transverse movement of any part of the brace is prevented, the brace being of lesser cross-sectional area than the shell so as to provide an interspace between them, there being a passage connecting said interspace with the bore of the tubular tailpiece.

16. A guard device for a pressure-responsive instrument, said guard device including a rigid support having a bore therethrough and a socket recess concentric with the bore, and a pressure flask consisting of a length of seamless drawn metal tubing having a neck portion of circular transverse section which fits snugly within said recess and which is permanently united to said rigid support, the major portion of the pressure flask being of substantially square transverse section and having smooth walls, a rigid core member of lesser transverse area than the flask disposed within the latter, there being a fluid-receiving space between the core member and the inner surface of the flask, one end of the core member being so connected to the support as to prevent transverse movement of any portion of the core member and the other end of the core member being rigidly secured to and permanently closing the square end of the flask, there being a passage connecting said fluid-receiving space with the bore of the support.

17. A guard for a pressure-responsive instrument, said guard comprising an elongate, thin-walled shell of resilient material, means including a tubular part operative to connect one end of the shell with the instrument, a rigid core member extending longitudinally of the shell and within the latter, the transverse dimensions of the core member being such as to provide a fluid-receiving space between the core member and the inner surface of the shell except adjacent to the free end of the shell, means providing a passage connecting said space with the core of said tubular connecting part, the core member being so constructed and arranged as completely to fill the shell adjacent to the free end of the latter, and means forming a permanent leakproof union between the free end of the shell and the core member.

18. A guard for pressure-responsive instruments, said guard comprising an elongate, thin-walled shell of resilient metal, said shell being of substantially square transverse section throughout the major portion of its length but being of circular section at one end, and a rigid core member housed within the shell, the core member contacting the inner surface of the shell adjacent to opposite ends of the latter but being free from contact with the shell throughout the major part of its length thereby to provide a fluid-receiving interspace, the core completely filling the square end of the shell and being permanently united to the latter, the parts being so constructed and arranged as to provide a passage leading from said interspace to the upper end of the shell.

19. A guard for a pressure-responsive instrument, said guard comprising an elongate, thin-walled shell of resilient metal, said shell being of substantially square transverse section throughout the major portion of its length but being of circular section at one end, and a rigid core member housed within the shell, one end of the core member completely filling the square end of the shell, the opposite end portion of the core member having spaced bearing elements engaging the interior of the circular portion of the shell at peripherally spaced points, the core being of such transverse dimensions intermediate its end portions as to provide a space between it and the inner wall of the shell for the reception of pressure fluid.

FRANK H. HOPKINS.